United States Patent
Amano et al.

(10) Patent No.: US 7,441,240 B2
(45) Date of Patent: Oct. 21, 2008

(54) PROCESS SCHEDULING APPARATUS, PROCESS SCHEDULING METHOD, PROGRAM FOR PROCESS SCHEDULING, AND STORAGE MEDIUM RECORDING A PROGRAM FOR PROCESS SCHEDULING

(75) Inventors: Katsushige Amano, Kyoto (JP); Tetsuji Yamamoto, Hirakata (JP); Kiyoshi Owada, Hirakata (JP); Hiroyuki Machida, Kanagawa (JP); Takao Shinohara, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 942 days.

(21) Appl. No.: 10/750,852

(22) Filed: Jan. 5, 2004

(65) Prior Publication Data

US 2004/0158831 A1 Aug. 12, 2004

(30) Foreign Application Priority Data

Jan. 7, 2003 (JP) ............................. 2003-001245

(51) Int. Cl.
G06F 9/46 (2006.01)
(52) U.S. Cl. .................... 718/102; 718/100; 718/103
(58) Field of Classification Search ................. 718/102, 718/100, 103, 108
See application file for complete search history.

(56) References Cited

U.S. PATENT DOCUMENTS

| 5,465,335 | A | * | 11/1995 | Anderson | 718/107 |
| 5,469,571 | A | | 11/1995 | Bunnell | |
| 5,928,348 | A | * | 7/1999 | Mukai et al. | 710/263 |
| 5,944,778 | A | * | 8/1999 | Takeuchi et al. | 718/100 |
| 6,662,203 | B1 | * | 12/2003 | Kling et al. | 718/103 |

FOREIGN PATENT DOCUMENTS

JP 62-42251 2/1987

\* cited by examiner

*Primary Examiner*—Meng-Ai An
*Assistant Examiner*—Kenneth Tang
(74) *Attorney, Agent, or Firm*—Wenderoth, Lind & Ponack, L.L.P.

(57) ABSTRACT

A process scheduling apparatus has a delayed task handling process for processing delayed tasks having variable priorities and multiple other processes for handling processes other than delayed tasks. Fixed priorities are assigned to the other processes. The process scheduler sequentially executes the delayed task handling process and the other processes according the assigned priorities. A delayed task registration processor stores newly generated delayed tasks with assigned priorities in a queuing table. A delayed task priority controller selects the delayed task with the highest priority in the queuing table. A process priority controller sets the priority of the delayed task handling process to the same priority as the priority of the delayed task with the highest priority.

3 Claims, 12 Drawing Sheets

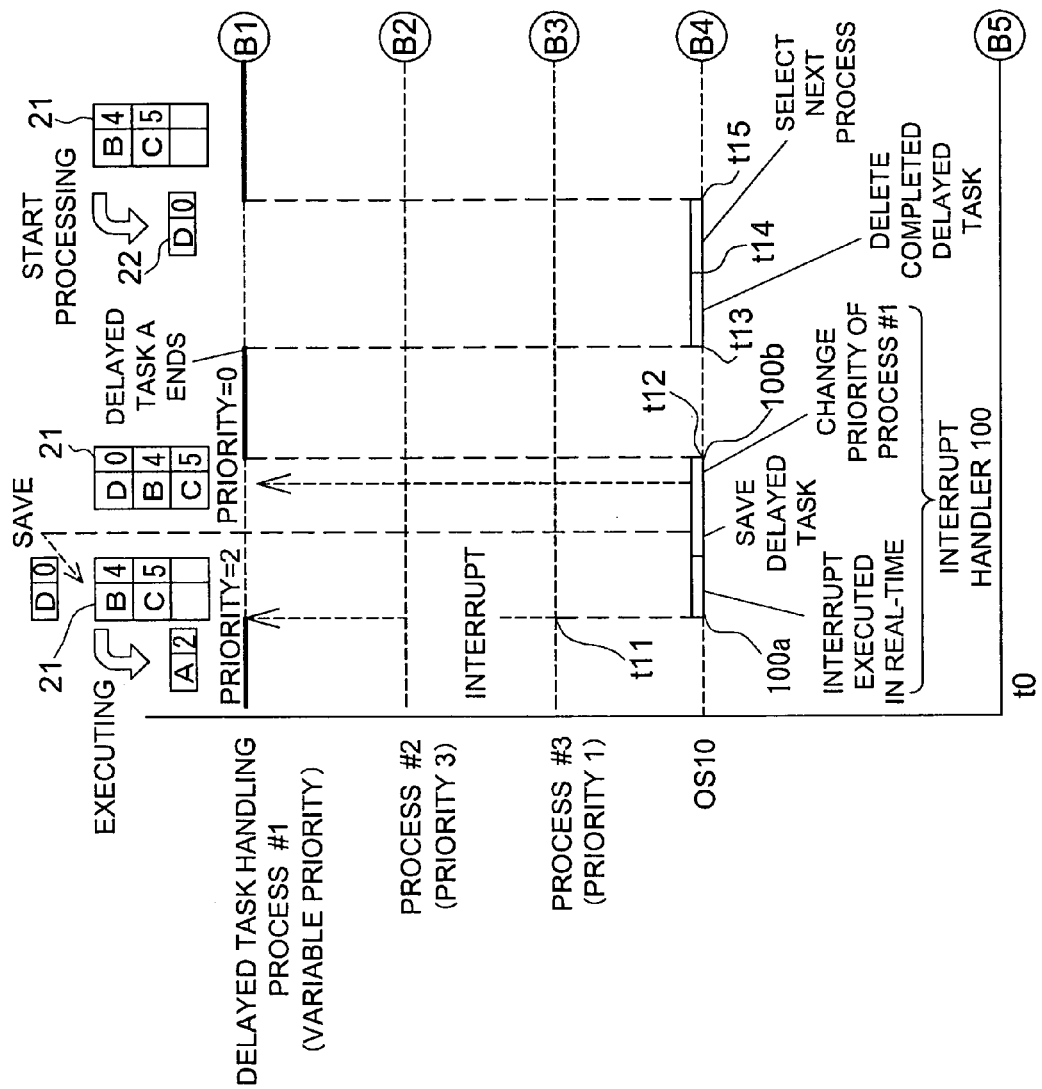

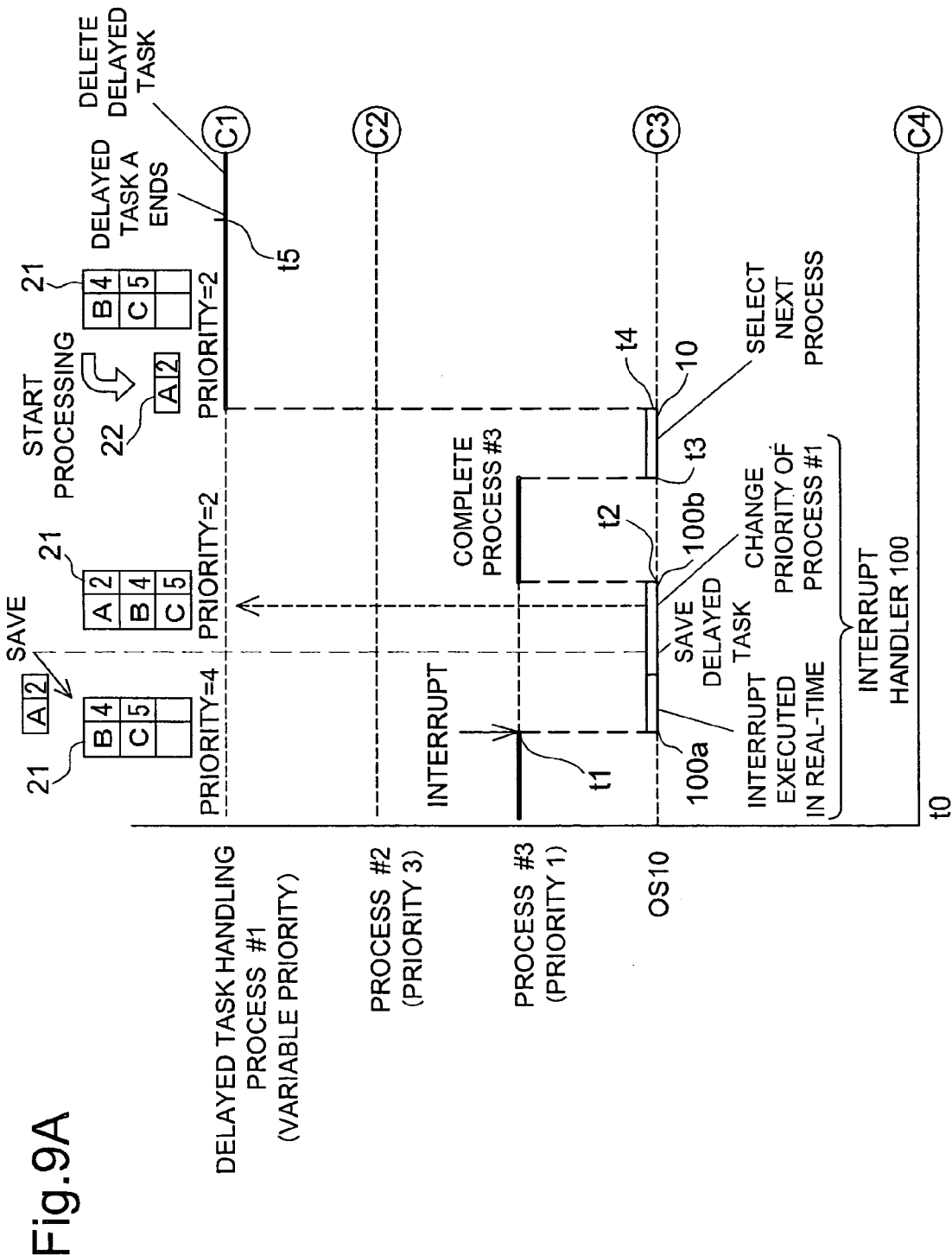

PROCESS SCHEDULING APPARATUS, PROCESS SCHEDULING METHOD, PROGRAM FOR PROCESS SCHEDULING, AND STORAGE MEDIUM RECORDING A PROGRAM FOR PROCESS SCHEDULING

BACKGROUND OF THE INVENTION

1. Field of the Invention

The present invention relates to a process scheduling apparatus, a process scheduling method, a program for process scheduling, and a storage medium for recording a program for process scheduling to enable efficient and appropriate scheduling in a multiprocessing environment.

2. Description of Related Art

Computers are increasingly commonly used in many fields such as home appliances and cell phones in addition to applications in fields such as mainframe computers and personal computers.

Multiprocessing is a known technique used for efficient processing in a computer. In the multiprocessing, for achievement of parallel processing, a program is divided into multiple execution units called processes, threads, or tasks (referred to herein as processes), and scheduling of the execution units is executed according to the priority assigned to each process. However, even in a multiprocessing environment, all execution units are not uniformly executed as the processes but many execution units run in a form other than the process. For example, execution units for processing an interrupt request (referred to as interrupt handlers) are not executed as the process. Furthermore, the part of the interrupt handler not requiring real-time execution is often executed in a form other than the process at the appropriate timing.

In order to determine which tasks executed in the form other than the process, such as the part of the interrupt handler not requiring real-time processing (referred to herein as a "delayed task") and the process should be executed by priority, a process scheduling in which priorities are assigned to delayed tasks as well as processes can be considered. With respect to such process scheduling, for example, Japanese Patent Application Laid-open Publication No. 62-42251 discloses an event scheduling method for queuing events after they are prioritized and then running the processes related to the events sequentially from high to low priority. This event scheduling method could be further developed to a scheduling of the processes and the delayed tasks by treating the events as the delayed tasks and handling an activated process by the event as an actual process corresponding to the delayed task.

However, since the event scheduling method disclosed in No. 62-42251 is not assumed to be used in a multiprocessing environment, the method cannot efficiently and appropriately schedule the processes and the delayed tasks. Specifically, if the method would be applied to a multiprocessing environment, one process had to be linked to each event. Running a different process for every event in the multiprocessing environment means that a large number of processes will be run and it will be necessary to repeatedly create and delete the processes in a short interval. Due to the repeat of creation and deletion of the processes in a short interval, heavy load is applied to a computer. Further, scheduling takes longer as the number of executing processes increases, and more memory is needed for process management.

SUMMARY OF THE INVENTION

A first aspect of the invention provides a process scheduling apparatus for performing parallel processing of a plurality of processes respectively having assigned priorities, comprising: at least one delayed task processing unit for executing delayed tasks among the plurality of processes, having a queuing table in which the delayed tasks are to be registered, and having an assigned priority that is variable; a plurality of normal process executing units for respectively executing one of the plurality of processes other than the delayed tasks, and having an assigned priority identical to the priority of the executed process; a process scheduling unit for sequentially activating the delayed task processing unit and the normal process executing units according to the priorities assigned to these units so as to make these units execute corresponding processes; a delayed task registration processor for registering a newly generated delayed task with the priority thereof to the queuing table of the delayed task processing unit; a delayed task priority controller for selecting the delayed task of highest priority from the delayed tasks registered in the queuing table; and a process priority controller for setting the priority of the delayed task processing unit identical to the priority of the delayed task selected by the delayed task priority controller.

A delayed task as used herein refers to a task executed as other than a normal process in a multiprocessing environment. For example, the delayed tasks include a task involved in an interrupt handler task for which processing can be delayed. The delayed tasks also include tasks that are requested by a process but do not require immediate processing and can therefore be delayed.

According to the present invention, the priority of the delayed task processing unit for executing delayed processes in a process scheduling apparatus is set to the identical priority to the highest priority of the delayed task stored in the queuing table of the delayed task processing unit itself. Therefore, the delayed tasks and processes other than delayed tasks can be efficiently and appropriately scheduled according to the respectively assigned priorities.

To prevent priority inversion, i.e. a phenomenon in which a high priority process is executed after a lower priority process, it is preferable that when the new delayed task is generated, the process priority controller sets the priority of the delayed task processing unit before an initiation of a next process following a currently executed process at the generation of the new delayed task. More specifically, when the new delayed task is generated, the process priority controller suspends the currently executed process, sets the priority of the delayed task processing unit, and then resumes the suspended process. Alternatively, when the new delayed task is generated, the process priority controller sets the priority of the delayed task processing unit after a termination of the currently executed process but before the initiation of the next process. These processes include both the processes executed by the normal process executing units and the delayed tasks executed by the delayed task processing unit.

A second aspect of the invention provides a process scheduling method for performing parallel processing of a plurality of processes respectively having assigned priorities, comprising: sequentially executing a delayed task handling process for processing delayed tasks and normal processes for executing processes other than the delayed tasks according to priorities respectively assigned to the delayed task handling process and the normal processes; registering a newly generated delayed task with the priority assigned thereto in a queuing table; selecting a delayed task of highest priority from the delayed tasks registered in the queuing table; and setting the priority of the delayed task handling process identical to the priority of the selected delayed task.

A third aspect of the invention provides a program for performing parallel processing of a plurality of processes respectively having assigned priorities, comprising: sequentially executing a delayed task handling process for processing delayed tasks and normal processes for executing processes other than the delayed tasks according to priorities respectively assigned to the delayed task handling process and the normal processes; registering a newly generated delayed task with the priority assigned thereto in a queuing table; selecting a delayed task of highest priority from the delayed tasks registered in the queuing table; and setting the priority of the delayed task handling process identical to the priority of the selected delayed task.

A fourth aspect of the invention provides a computer-readable storage medium recording the above-mentioned program.

According to the present invention, the priority of the delayed task handling process for handling delayed tasks is set to the same priority as the that of the highest priority delayed task stored in the queuing table of the delayed task handling process itself. Therefore, the delayed tasks and processes other than delayed tasks can be efficiently and appropriately scheduled according to the respectively assigned priorities.

Furthermore, the priority inversion phenomenon can be prevented by setting the priority of the delayed task handling process at the generation of the new delayed task after the termination of the currently executed process but before the initiation of the next process.

BRIEF DESCRIPTION OF THE DRAWINGS

These and other objects and features of the present invention will become apparent from the following description taken in conjunction with preferred embodiments thereof with reference to the accompanying drawings, in which:

FIGS. 6A and 6B are timing charts showing another example of process scheduling in the first embodiment of the present invention;

FIGS. 9A and 9B are timing charts showing process scheduling in a fourth embodiment of the present invention.

DESCRIPTION OF THE PREFERRED EMBODIMENTS

Figure 1:
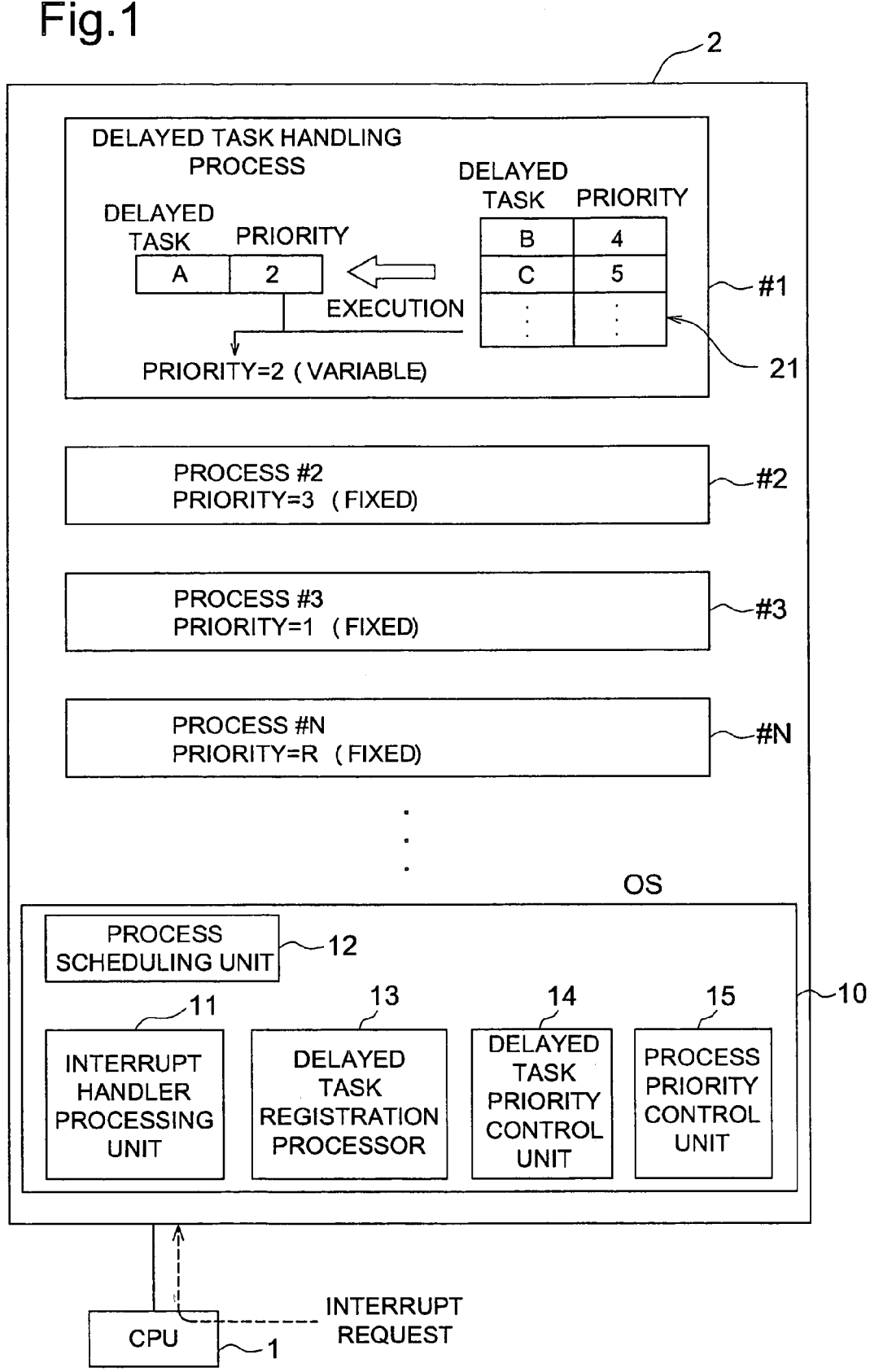
FIG. 1 is a schematic diagram showing a computer forming a process scheduling apparatus according to a first embodiment of the present invention.

FIG. 1 shows a computer operating as a process scheduling apparatus according to the present invention. The computer is provided with at least a CPU 1 and memory 2. The computer may also be provided with other devices such as input and output devices.

The CPU 1 can be any type of processor having sufficient processing capacity.

Stored in the memory 2 are programs and data including operating system (OS) 10 for the computer, at least one delayed task handling process #1, and a plurality of other processes #2 to #N (where N is a natural number). The memory 2 can be any type of memory, including RAMs and flash memories as far as having sufficient performance and capacity. Further, the memory 2 is not limited to a single memory device, and can be multiple memory devices of the same type or different types, including ROMs. Furthermore, an external storage device such as a hard disk drive can be provided separately from memory 2, and the programs and data can be moved to this external storage device insofar as it does not interfere with the operation of the computer.

The delayed task handling process #1 is a specialized process for processing only delayed tasks. In view of function, the delayed task handling process #1 constitutes a delayed task processing unit. The other processes #2, #3, ... #N are normal processes for executing processes other than delayed tasks. In view of function, each of the processes #2, #3, ... #N constitutes a normal process executing unit. A priority is assigned to each of the delayed task handling process #1 and the other processes #2, #3, ... #N. In the first embodiment, the priority of the process is represented by numbers 0, 1, 2, 3, ... R, that is, using 0 and natural numbers. Smaller values of the numbers indicate higher priority. However, representation of the priority shall not be limited, and any method denoting process priority can be used insofar as it can properly define priority among processes. The priority assigned to the delayed task handling process #1 is variable, and can be changed according to the delayed task being processed as further described below. On the other hand, the priority assigned to each of the other processes #2, #3, ... #N is fixed, and cannot be changed. In FIG. 1, of the processes other than the delayed task handling process #1, the priority of the process #2 is 3 and the priority of the process #3 is 1.

The delayed task handling process #1 has a queuing table 21. When a new delayed task is generated, an identifier for the delayed task and the priority of the task are stored in the queuing table 21. Alphabetic characters such as A, B, C are used as the delayed task identifiers in the first embodiment. However, the delayed task identifiers are not so limited, and any means of uniquely identifying each delayed task can be adopted. Further, in the first embodiment, the priorities of delayed tasks are represented by using 0 and natural numbers, i.e. numbers 0, 1, 2, 3 ... , as same as the priorities of the delayed task handling process #1 and the other processes #2, #3, ... #N. Smaller values of the numbers indicate higher priorities. The delayed task handling process #1 executes the delayed tasks registered in the queuing table 21 in order of priority. The priority of the delayed task handling process #1 itself is identical to the highest priority of all delayed tasks registered in the queuing table 21. In the example shown in FIG. 1, a delayed task B of priority 4 and a delayed task C of priority 5 are registered in the queuing table 21. The currently executed delayed task is the delayed task A with the highest priority (priority 2). The currently executed delayed tasks are not deleted from the queuing table 21 until the termination of processing thereof. For clarity, in FIG. 1, the currently executed task A is shown separated from the other delayed tasks B and C in the queuing table 21. In FIG. 1 the priority of delayed task handling process #1 is set to the priority of the highest-priority delayed task A (priority 2).

To implement the scheduling method in cooperation with the CPU, the OS 10 has an interrupt handler processing unit 11, process scheduling unit 12, delayed task registration processor 13, delayed task priority control unit 14, and process priority control unit 15. Functions of these units will be described. The interrupt handler processing unit 11 processes interrupt handlers generated by interrupt requests. Further, the process scheduling unit 12 sequentially executes the active processes according to priorities respectively assigned to the delayed task handling process #1 and other processes #2, #3, . . . #N, and thus parallel processes multiple processes on a time-share basis. Furthermore, the delayed task registration processor 13 registers an identifier of a newly generated delayed task and the priority assigned to the new delayed task in the queuing table 21 of the delayed task handling process #1. Further, the delayed task priority control unit 14 selects the delayed task of highest priority from the delayed tasks registered in the queuing table 21. The delayed task priority control unit 14 may also sort the delayed tasks registered in the queuing table 21 from highest to lowest priority. Furthermore, the process priority control unit 15 sets the priority of the delayed task handling process #1 identical to the priority of the delayed task selected by the delayed task priority control unit 14.

The operation of a multiprocessing scheduling apparatus of the first embodiment will be described with reference to the flow charts in FIGS. 2 and 3. The function shown in these flow charts can be achieved by a program. Further, such program can be recorded to a computer-readable storage medium.

Figure 2:
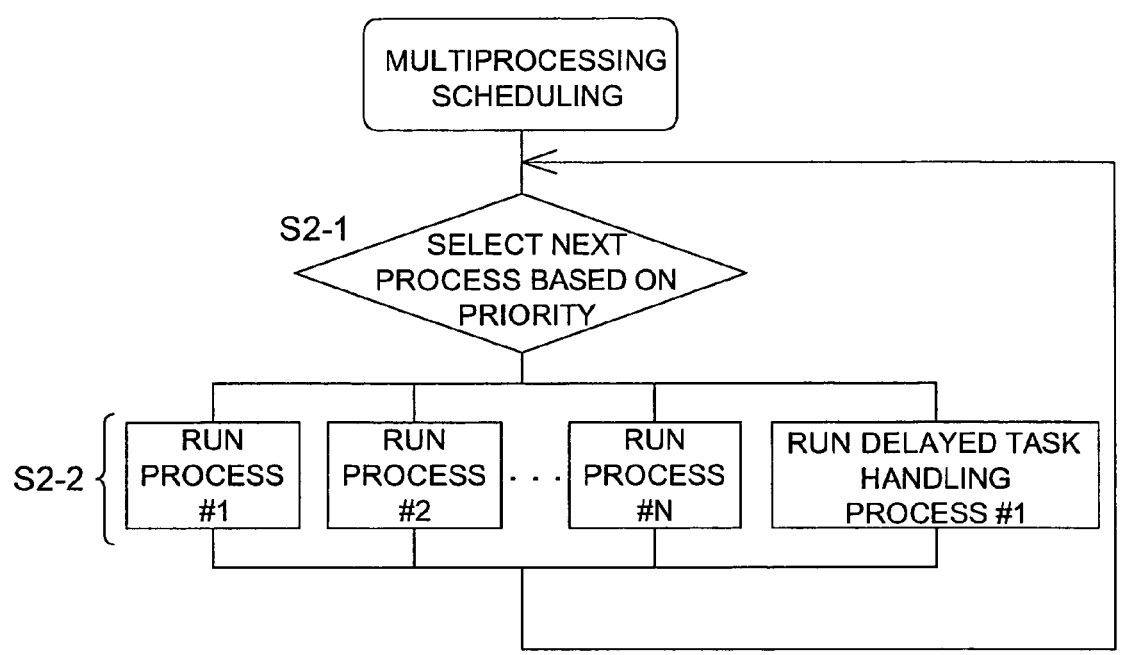
FIG. 2 is a flow chart for describing the operation of a process scheduling unit.

In step S2-1 of FIG. 2, the process scheduling unit 12 selects the next process to run based on priorities assigned to processes. Specifically, the process scheduling unit 12 compares the priorities of all active processes among the delayed task handling process #1 and the other processes #2, #3, . . . #N, and executes the active processes in order from the highest priority. In step S2-2, any one of the delayed task handling process #1 and the other processes #2, #3 . . . #N selected in step S2-1 is executed. When processing of the process is terminated, the process scheduling unit 12 again selects the next process in step S2-1.

Figure 3:
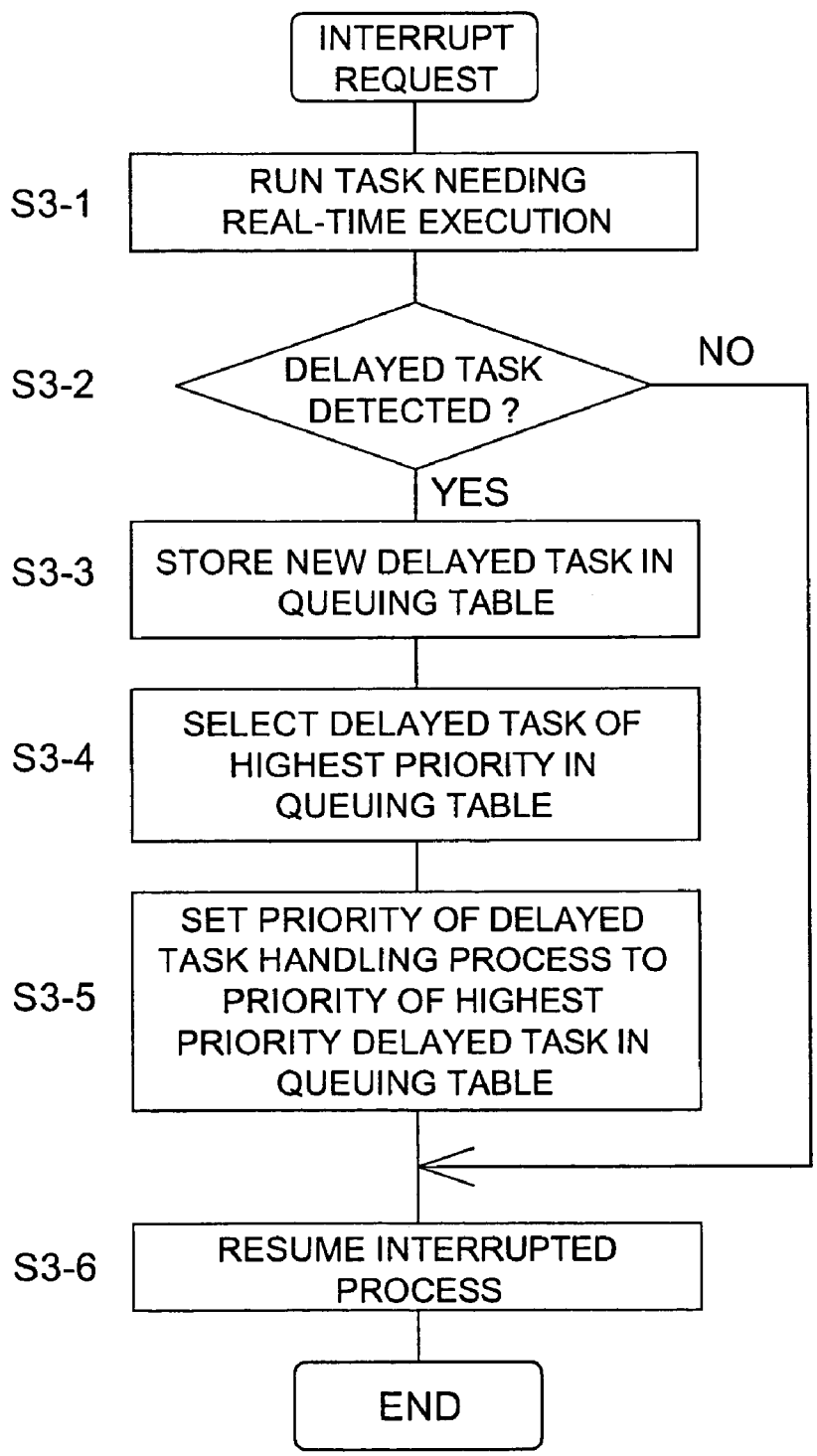
FIG. 3 is a flow chart for describing processing of an interrupt request.

FIG. 3 shows a process when an interrupt request occurs during execution of process #2, #3, . . . #N. When the interrupt request occurs, in step S3-1, the interrupt handler processing unit 11 executes tasks included in the interrupt handler requiring real-time processing (real-time process tasks). In step S3-2, the interrupt handler processing unit 11 determines if the interrupt handler includes a delayed task. If there are no delayed tasks, then the interrupted process resumes in step S3-6. If a delayed task exists, then, in step S3-3, the delayed task registration processor 13 registers an identifier of the delayed task and a priority thereof to the queuing table 21 of the delayed task handling process #1. Then, in step S3-4, the delayed task priority control unit 14 selects the delayed task with the highest priority from among the delayed tasks registered in the queuing table 21. In step S3-5, the process priority control unit 15 then sets the priority of delayed task handling process #1 to the priority of the highest priority of the delayed task selected by the delayed task priority control unit 14. After the setting of the priority of the delayed task handling process #1, the interrupted process resumes in step S3-6.

Figure 4:
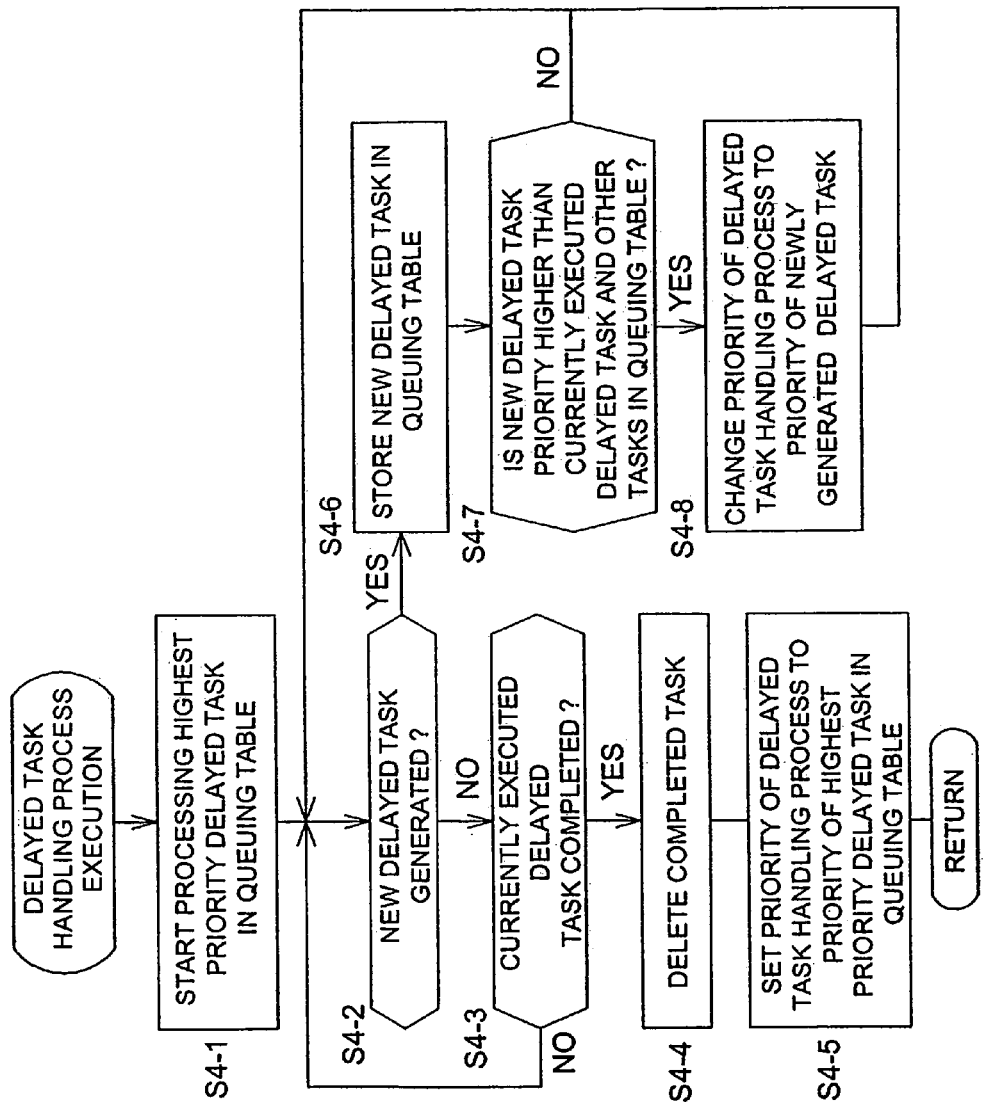
FIG. 4 is a flow chart showing a delayed task handling process according to the first embodiment.

FIG. 4 shows the content of the delayed task handling process (step 2-2 in FIG. 2). First, in step S4-1, execution of the highest priority delayed task registered in the queuing table 21 starts. Then, in step S4-2, whether a new delayed task has been generated is determined. In other words, whether a new interrupt process has been requested and whether the requested interrupt process contains a delayed task are determined in step S4-2. If step S4-2 determines that a new delayed task was not spawned, processing the delayed task currently executing continues in step S4-3 until the delayed task is completed. Then, in step S4-4, the delayed task registration processor 13 deletes the completed delayed task from the queuing table 21. Further, in step S4-5, the priority of the delayed task handling process #1 is set to the priority of the highest priority delayed task in the queuing table 21. More specifically, the delayed task priority control unit 14 detects the delayed task with the highest priority in the queuing table 21, and the process priority control unit 15 sets the priority of the delayed task handling process #1 to the same priority as that of the selected delayed task.

On the other hand, if a new delayed task is detected in step S4-2, then, in step S4-6, the delayed task registration processor 13 registers the identifier and priority of the newly generated delayed task in the queuing table 21. Then in step S4-7 the delayed task priority control unit 14 determines if the priority of the new delayed task is higher than the priority of the currently executed delayed task and any other delayed tasks in the queuing table 21. If step S4-7 determines that the priority of the new delayed task is not higher than the priority of the currently executed delayed task or any other delayed tasks in the queuing table 21, then the procedure goes back to step S4-2. However, if the priority of the new delayed task is higher than the currently executed task and other delayed tasks in the queuing table 21, then, in step S4-8, the process priority control unit 15 changes the priority of the delayed task handling process #1 to the priority of the newly generated delayed task.

Figure 5A:
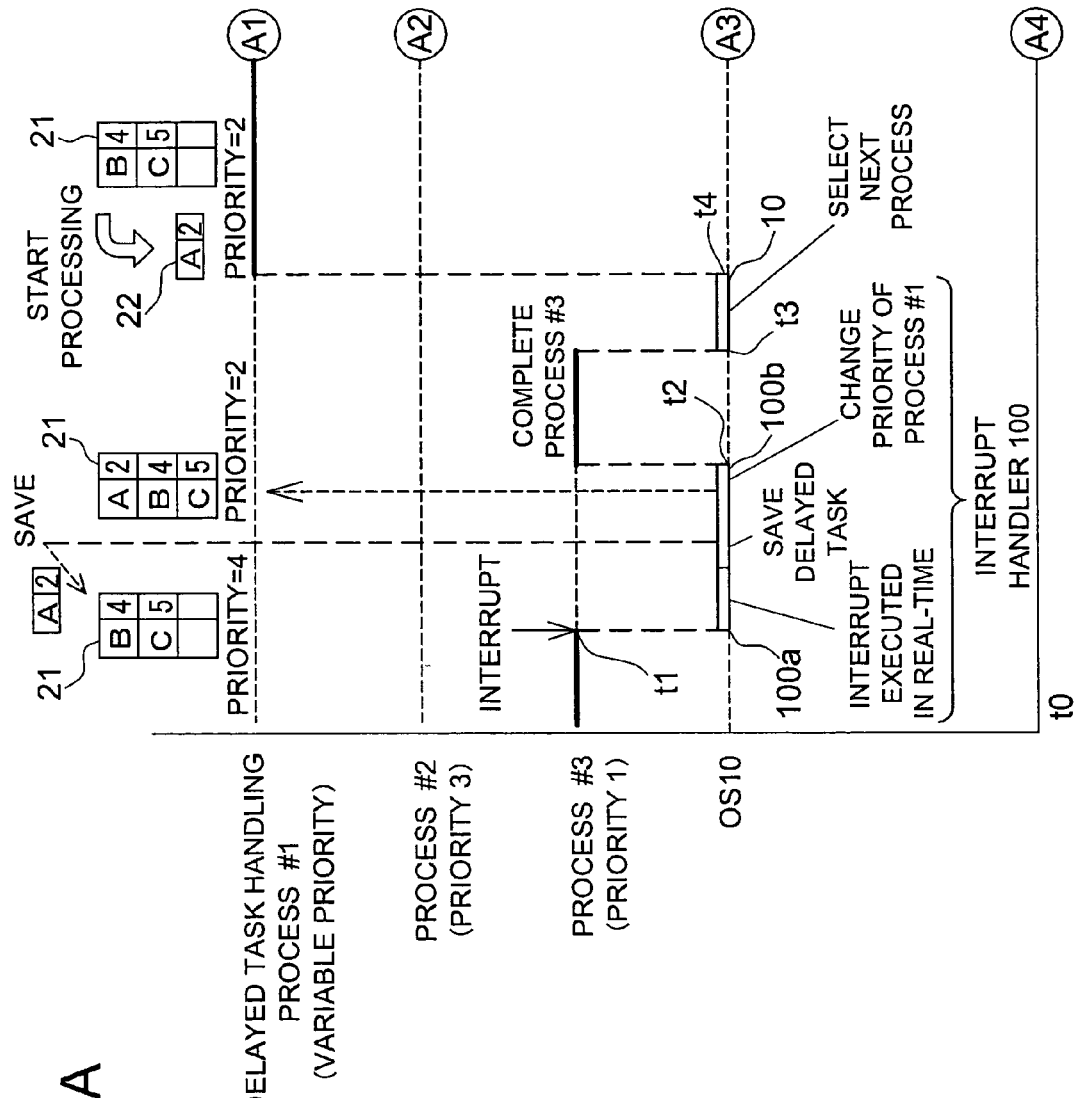
FIGS. 5A and 5B are timing charts showing an example of process scheduling in the first embodiment of the present invention.
Figure 5B:
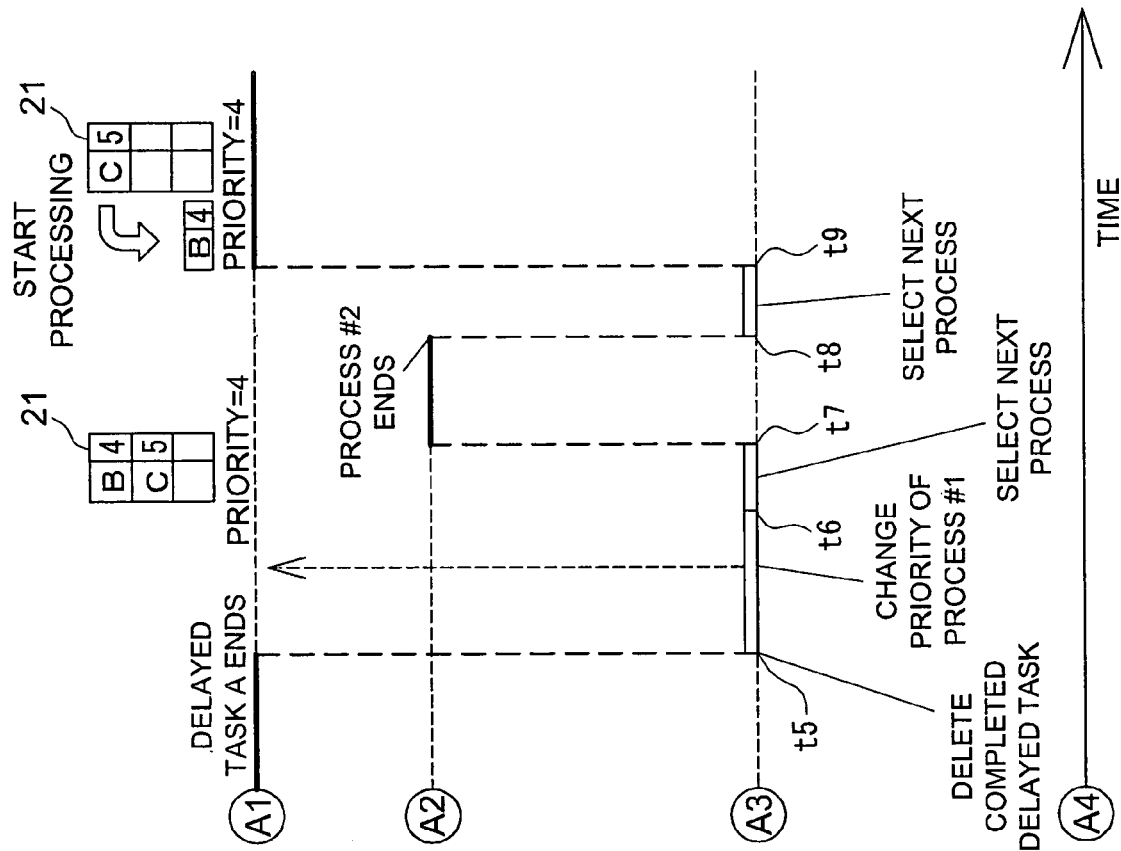
Figure 6B:
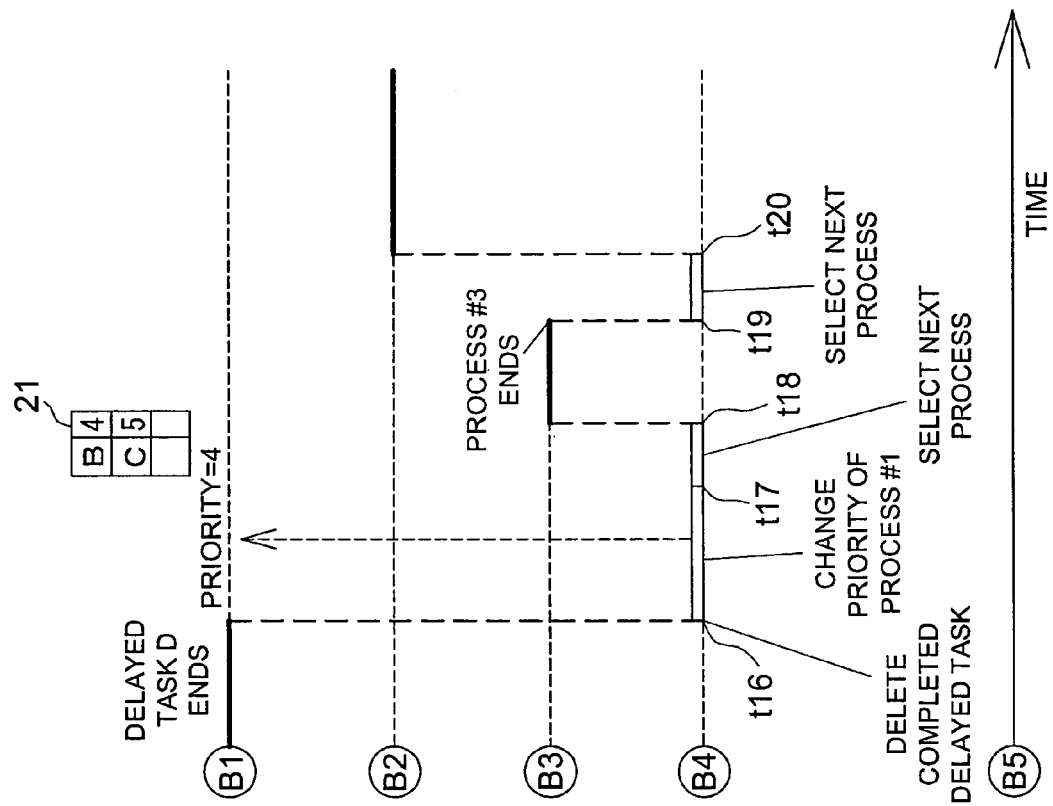

An example of simplified multiprocessing scheduling according to the first embodiment will be described with reference to FIGS. 5A, 5B, 6A, and 6B. In FIGS. 5A to 6B, the thick bold lines indicate that a process has reserved CPU 1 and been executed, whereas an outlined heavy line indicates that processing of the OS 10 is being executed by the CPU 1. FIGS. 5A and 5B show an example in which an interrupt request occurs while one of the process #2, #3, . . . #N other than the delayed task handling process #1 is running. FIGS. 6A and 6B show an example in which an interrupt request occurs while the delayed task handling process #1 is running.

Referring to FIGS. 5A and 5B, at time t0, a delayed task B of priority 4 and a delayed task C of priority 5 are registered in the queuing table 21 of the delayed task handling process #1, and the delayed task handling process #1 is set to priority 4. Process #2 of priority 3 and process #3 of priority 1 are active.

An interrupt request occurs at time t1 while process #3 is running, and the interrupt handler processing unit 11 runs the interrupt handler 100 (from time t1 to time t2, steps S3-1 to S3-6). The part of interrupt handler 100 denoted 100a in FIG. 5A is a real-time execution task (step S3-1). The delayed task registration processor 13 registers the newly generated delayed task A (priority 2) in the queuing table 21 at a part 100b of the interrupt handler 100 (step S3-3). Further, since the priority of the new delayed task A is higher than the priority of delayed tasks B and C already registered in the queuing table 21, the delayed task priority control unit 14 and process priority control unit 15 set the priority of delayed task handling process #1 to the same priority as delayed task A, i.e.

priority 2 (steps S3-4 and S3-5). After processing of the interrupt handler ends, process #3 resumes (time t2 to time t3, step S3-6). When processing process #3 is completed, the process scheduling unit 12 selects the next process to be executed (time t3 to time t4, steps S2-1 and S2-2). The priority of the delayed task handling process #1 (priority 2) and the priority of process #2 (priority 3) are compared. By the comparison, the higher priority process, i.e. the delayed task handling process #1, is selected.

The delayed task handling process #1 then runs the process of delayed task A having the highest priority in the queuing table 21 (time t4 to time t5, step S4-1). If a new delayed task is not generated (step S4-2) and processing delayed task A is completed at time t5 (step S4-3), then the delayed task handling process #1 posts the termination of the process to the OS 10. This causes the delayed task registration processor 13 of the OS 10 to delete the completed delayed task A from the queuing table 21 (step S4-4). Then, the delayed task priority control unit 14 and process priority control unit 15 set the priority of the delayed task handling process #1 to the priority of the highest priority delayed task B in the queuing table 21, i.e. priority 4 (time t5 to time t6, step S4-5).

After the delayed task handling process #1 thus completes execution of one delayed task and the priority of the delayed task handling process #1 is then changed, the process scheduling unit 12 selects the next process to be executed (time t6 to t7). The priority of the delayed task handling process #1 (priority 4) and the priority of process #2 (priority 3) are then compared, resulting in that the highest priority process, i.e. process #2, is selected.

After the process #2 is executed (time t7 to t8), the process scheduling unit 12 selects the next process to be executed (time t8 to t9). The delayed task handling process #1, which remains unexecuted because it had the lowest priority, is selected and executed. The delayed task handling process #1 executes the delayed task B of the highest priority in the queuing table 21 (priority 4).

The delayed task A of priority 2 is thus executed (time t4 to t5), the process #2 of priority 3 is then executed (time t7 to t8), and finally the delayed task B of priority 4 is executed. Therefore, multiprocessing scheduling of the first embodiment efficiently and appropriately schedules both delayed tasks and processes according to their respective priorities.

Referring to FIGS. 6A and 6B, at time t0, delayed task A of priority 2, delayed task B of priority 4, and delayed task C of priority 5 are registered in the queuing table 21 of the delayed task handling process #1, and the highest priority delayed task A is under execution. Further, the delayed task handling process #1 is set to the same priority 2 as the delayed task A at time t0.

An interrupt request occurs at time t11 while delayed task handling process #1 is running, and the interrupt handler 100 therefore runs (time t11 to time t12, steps S3-1 to S3-6). After the real-time execution task is processed (part 100a, step S3-1), the delayed task registration processor 13 registers the new delayed task D (priority 0) in the queuing table 21 (steps S3-2, S3-3, S4-6), and the delayed task priority control unit 14 and process priority control unit 15 change the priority of delayed task handling process #1 to priority 0 which is the same as that of the new delayed task D (steps S3-4, S3-5, S4-7, S4-8). After the termination of the interrupt handler, the delayed task handling process #1 resumes processing delayed task A (time t12 to time t13, step S3-6).

When processing delayed task A ends at time t13, the delayed task registration processor 13 deletes the completed delayed task A from the queuing table 21 (time t13 to t14). The priority of the delayed task handling process #1 is not changed, however, because it is already set to 0 (steps S4-2 to S4-5).

The process scheduling unit 12 then selects the next process to be executed (time t14 to t15, steps S2-1, S2-2). The priority of the delayed task handling process #1 (priority 0) and the priority of processes #2 and #3 (priority 3 and 1, respectively) are then compared, thereby the highest priority process, i.e. delayed task handling process #1, is selected. The delayed task handling process #1 then executes the delayed task D having the highest priority in the queuing table 21 (step S4-1). If delayed task D is completed at time t16 without a new delayed task being generated, the delayed task registration processor 13 deletes the completed delayed task D from the queuing table 21, and sets the priority of delayed task handling process #1 to the priority 4 of the delayed task B having the highest priority in the queuing table 21 (time t16 to t17, steps S4-2 to S4-5).

The process scheduling unit 12 then selects the next process to be executed. The process #3 is selected because it is set to a higher priority (priority 1) than the process #2 (priority 3). After execution of the process #3 (time t18 to t19), the remaining unexecuted process, i.e. process #2, is selected as the next process.

In the example shown in FIGS. 6A and 6B, the delayed task D having priority 0 is executed first (time t15 to t16), then the process #3 having priority 1 is executed, and process #2 having priority 3 is executed last. Therefore, the delayed tasks and the processes are efficiently and appropriately scheduled according to the assigned priority.

Since a single delayed task handling process #1 executes the delayed tasks, the multiprocessing scheduling method of the first embodiment does not need to repeatedly generate and delete processes for handling delayed tasks at short intervals, and thus does not impose a particular load in terms of the time for scheduling and memory consumption.

The scheduling of the processes and delayed tasks needs to prevent a phenomenon in which the higher priority processes are executed after the low priority processes (priority inversion). To prevent priority inversion in the first embodiment, the process priority control unit 15 changes the priority of the delayed task handling process #1 at substantially the same time when the delayed task registration processor 13 registers a new delayed task in the queuing table 21. Specifically, when a new delayed task is generated due to an interrupt request, the priority of the delayed task handling process #1 is changed before the termination of the process or delayed task under execution when the interrupt occurs, or after the termination of the process or delayed task under execution when the interrupt occurs but before the initiation of the next process or delayed task (see steps S3-3 to S3-5 in FIG. 3, steps S4-5 and S4-8 in FIG. 4, time t1 to t2 in FIG. 5A, and time t11 to t12 in FIG. 6A). In other words, the priority of the delayed task handling process #1 is set before the initiation of the next process (normal process or delayed task) following the currently executed process (normal process or delayed task) at the generation of the new delayed task.

Figure 7:
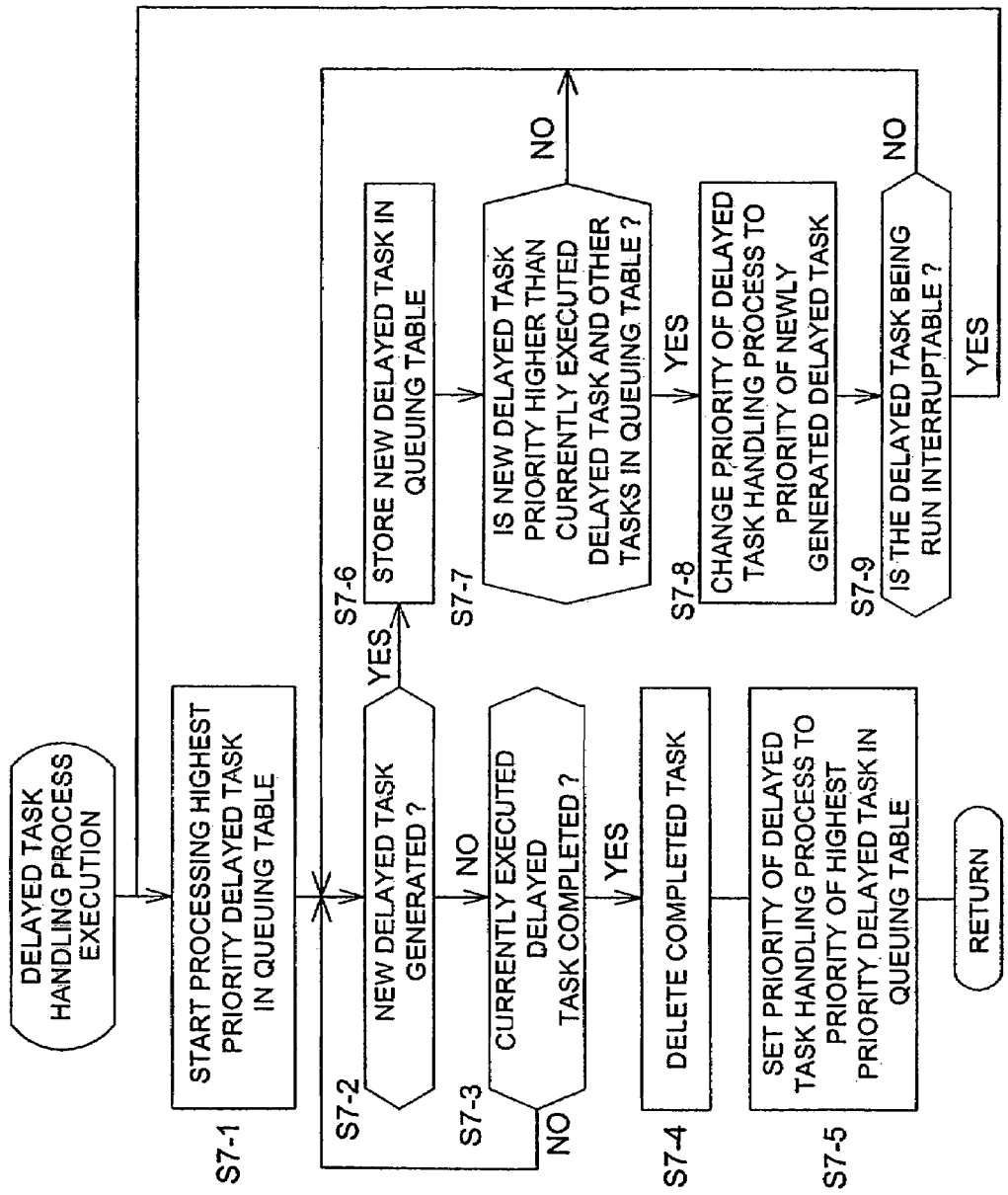
FIG. 7 is a flow chart for describing the delayed task handling process according to a second embodiment of the present invention.

FIG. 7 shows a second embodiment of the delayed task handling process. In the second embodiment, when a higher priority delayed task is generated while another delayed task is running, the delayed task under execution is immediately suspended, and then the newly generated higher priority delayed task is executed. Some delayed task cannot be interrupted, and in this case processing of the uninterruptable delayed task continues. For example, if the delayed task under executing is rewriting data and interruption will result in data corruption, the executing delayed task cannot be interrupted.

Steps S7-1 to S7-8 in FIG. 7 are identical to steps S4-1 to S4-8 in FIG. 4. If, in step S7-7, the priority of a newly generated delayed task is higher than the priority of the currently executed delayed task and other delayed tasks in the queuing table 21, then the priority of the delayed task handling process is set to the same priority as the new delayed task in step S7-8. If, in step S7-9, the delayed task under execution can be interrupted, then the control loop goes back to step S7-1, and processing of the delayed task with the highest priority in the queuing table 21 starts. Because the new delayed task registered in the queuing table 21 in step S7-6 is the highest priority task in the queuing table 21, the current delayed task is suspended and processing the new delayed task starts in step S7-1. However, if the current delayed task cannot be interrupted in step S7-9, then the control loop goes to step S7-2 and the current delayed task continues.

Figure 8:
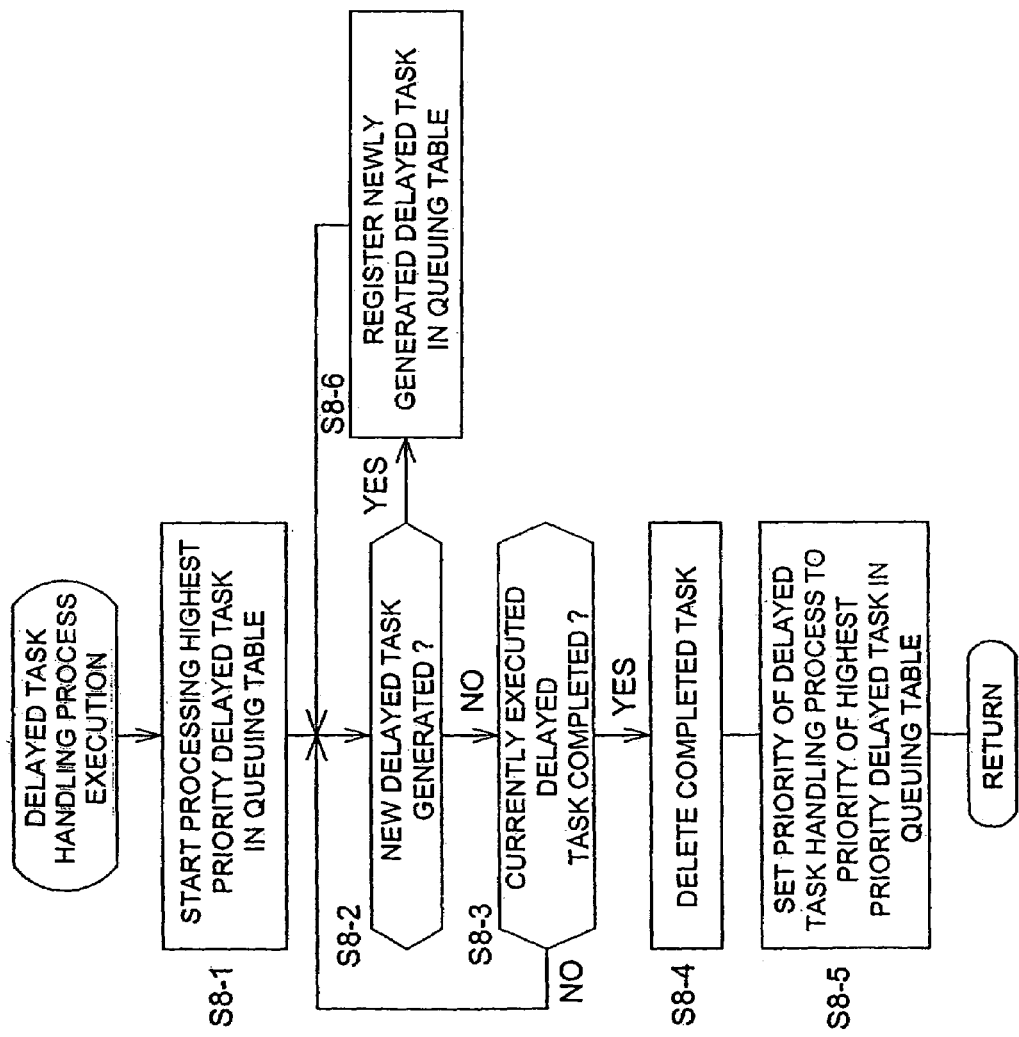
FIG. 8 is a flow chart for describing the delayed task handling process according to a third embodiment of the present invention.

FIG. 8 shows a third embodiment of the delayed task execution process. In the third embodiment, when a new delayed task is generated while a delayed task is being executed, the new delayed task is registered in the queuing table 21 but the priority of the delayed task handling process is changed after the current delayed task is completed. Steps S8-1 to S8-5 in FIG. 8 are identical to steps S4-1 to S4-5 in FIG. 4. When a new delayed task is generated in step S8-2, the new delayed task is registered in the queuing table 21 in step S8-6. The control loop then goes back to step S8-2, and the current delayed task continues.

Figure 9B:
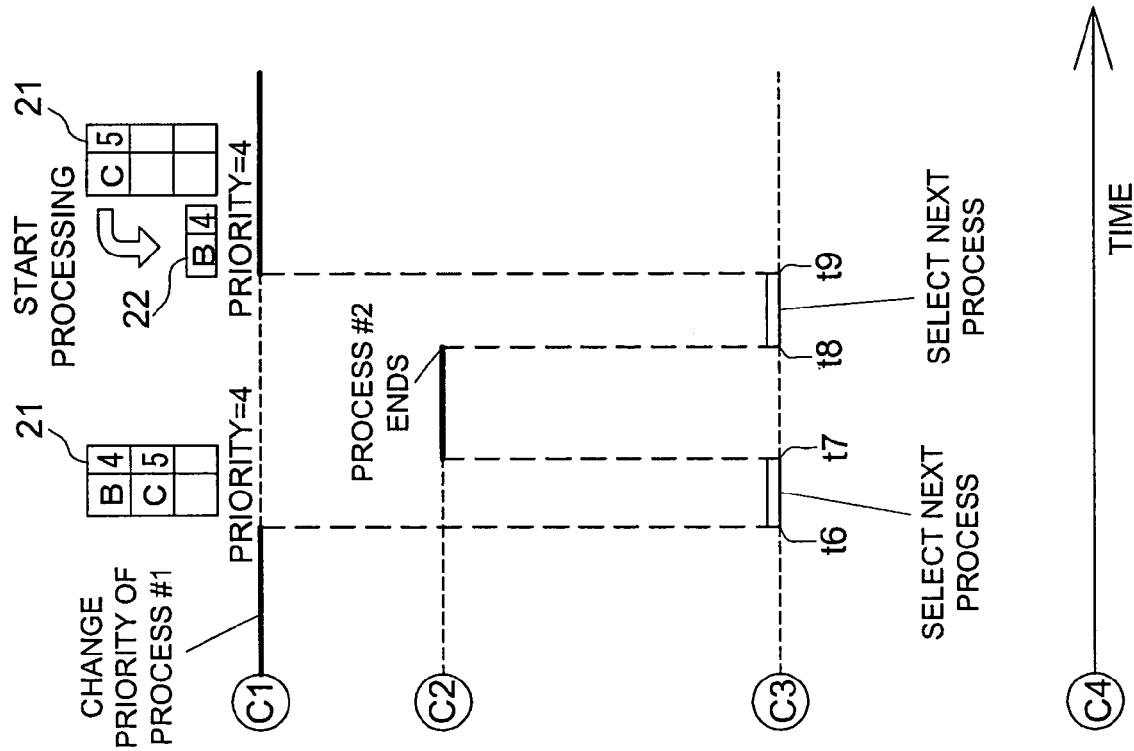

In the above-mentioned embodiments, registering and deleting delayed tasks in the queuing table 21 and changing the priority of the delayed task handling process are processed by the OS 10. However, the delayed task handling process #1 could handle part of the process. FIGS. 9A and 9B show an example in which the deleting of the completed delayed task and changing of the priority of the delayed task handling process #1 are handled by the delayed task handling process #1 itself. In FIGS. 9A and 9B, operations between time t0 and t5 and time t6 and time t9 are the same as those shown in FIG. 5A and FIG. 5B. When processing delayed task A is terminated at time t5, the delayed task handling process #1 deletes the delayed task A from the queuing table 21. The delayed task handling process #1 also changes its assigned priority to priority 4 which is the same as the priority of the delayed task B having the highest priority in the queuing table 21.

It will be obvious to one with ordinary skill in the related art that the present invention shall not be limited to these embodiments and can be varied in many ways. For example, two or more delayed task handling processes can be activated and operated in parallel insofar as the number of processes is relatively small.

Further, the delayed tasks shall not be limited to the delayed part of an interrupt handler as described in the above embodiments, and can be any operation executed in a form other than a process. For example, the present invention can also be adopted when an operating system that receives requests from a process that executes the part of the requests as a delayed task. Specifically, a process might request the OS to send data over a network, and the OS could decided that the requested data transmission does not require immediate processing and therefore execute the request as a delayed task. In such example, the process sends a data transmission request to the OS 10 instead of generating an interrupt process in FIGS. 5A to 6B.

The present invention relates to computer scheduling, and can therefore be applied in any field using a computer. For example, the present invention can be adopted in home appliances, cell phones and other communication devices, and industrial equipment.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A computing device comprising a processor, and a process scheduling apparatus for performing parallel processing of a plurality of processes respectively having assigned priorities, said process scheduling apparatus comprising:
   at least one delayed task processing unit for executing delayed tasks among the plurality of processes, the at least one delayed task processing unit having a queuing table in which the delayed tasks are to be registered and having an assigned priority that is variable, wherein the delayed tasks include a task involved in an interrupt handler task for which processing can be delayed;
   a plurality of normal process executing units for executing one of the plurality of processes other than the delayed tasks, and having an assigned priority identical to the priority of the executed process;
   a process scheduling unit for sequentially activating the at least one delayed task processing unit and the normal process executing units according to the priorities assigned to the at least one delayed task processing unit and the normal process executing units to make the at least one delayed task processing unit and the normal process executing units execute corresponding processes;
   a delayed task registration processor for registering a newly generated delayed task and a priority thereof in the queuing table of the at least one delayed task processing unit;
   a delayed task priority controller for selecting the delayed task of highest priority from the delayed tasks registered in the queuing table; and
   a process priority controller for setting the priority of the delayed task processing unit identical to the priority of the delayed task selected by the delayed task priority controller, wherein when a newly generated delayed task having a priority higher than that of a currently executed delayed task is generated, the process priority controller sets the priority of the at least one delayed task processing unit before termination of the currently executed delayed task by suspending the currently executed delayed task, setting the priority of the delayed task processing unit to the priority of the newly generated delayed task, and then, prior to executing the newly generated delayed task, resuming the currently executed delayed task to completion.

2. A process scheduling method for performing parallel processing of a plurality of processes respectively having assigned priorities, comprising:
   sequentially executing a delayed task handling process for processing delayed tasks and normal processes for executing processes other than the delayed tasks according to priorities respectively assigned to the delayed task handling process and the normal processes, wherein the delayed tasks include a task involved in an interrupt handler task for which processing can be delayed;

registering a newly generated delayed task and a priority assigned thereto in a queuing table;

selecting a delayed task of highest priority from the delayed tasks registered in the queuing table; and setting the priority of the delayed task handling process identical to the priority of the selected delayed task, wherein when a newly generated delayed task having a priority higher than that of a currently executed delayed task is generated, the priority of the delayed task handling process is set before termination of the currently executed delayed task, and said setting the priority of the delayed task handling process comprises:

suspending the currently executed delayed task;

setting the priority of the delayed task handling process to the priority of the newly generated delayed task; and resuming, prior to executing the newly generated delayed task, the currently executed delayed task to completion.

3. A computer program recorded on a computer-readable storage medium for performing parallel processing of a plurality of processes respectively having assigned priorities, wherein said computer program includes:

at least one delayed task processing unit for executing delayed tasks among the plurality of processes, the at least one delayed task processing unit having a queuing table in which the delayed tasks are to be registered and having an assigned priority that is variable, wherein the delayed tasks include a task involved in an interrupt handler task for which processing can be delayed;

a plurality of normal process executing units for executing one of the plurality of processes other than the delayed tasks, and having an assigned priority identical to the priority of the executed process;

a process scheduling unit for sequentially activating the at least one delayed task processing unit and the normal process executing units according to the priorities assigned to the at least one delayed task processing unit and the normal process executing units to make the at least one delayed task processing unit and the normal process executing units execute corresponding processes;

a delayed task registration processor for registering a newly generated delayed task and a priority thereof in the queuing table of the at least one delayed task processing unit;

a delayed task priority controller for selecting the delayed task of highest priority from the delayed tasks registered in the queuing table; and a process priority controller for setting the priority of the delayed task processing unit identical to the priority of the delayed task selected by the delayed task priority controller, wherein when a newly generated delayed task having a priority higher than that of a currently executed delayed task is generated, the process priority controller sets the priority of the at least one delayed task processing unit before termination of the currently executed delayed task by suspending the currently executed delayed task, setting the priority of the delayed task processing unit to the priority of the newly generated delayed task, and then, prior to executing the newly generated delayed task, resuming the currently executed delayed task to completion.

* * * * *

UNITED STATES PATENT AND TRADEMARK OFFICE
CERTIFICATE OF CORRECTION

| | | |
|---|---|---|
| PATENT NO. | : 7,441,240 B2 | Page 1 of 1 |
| APPLICATION NO. | : 10/750852 | |
| DATED | : October 21, 2008 | |
| INVENTOR(S) | : Katsushige Amano et al. | |

It is certified that error appears in the above-identified patent and that said Letters Patent is hereby corrected as shown below:

TITLE PAGE

Section (73), Assignee, "Matsushita Electric Industrial Co., Ltd., Osaka (JP)" should read
-- Matsushita Electric Industrial Co., Ltd., Osaka (JP) and Sony Corporation, Tokyo (JP) --.

Signed and Sealed this

Sixteenth Day of March, 2010

David J. Kappos
*Director of the United States Patent and Trademark Office*